Figure 1:
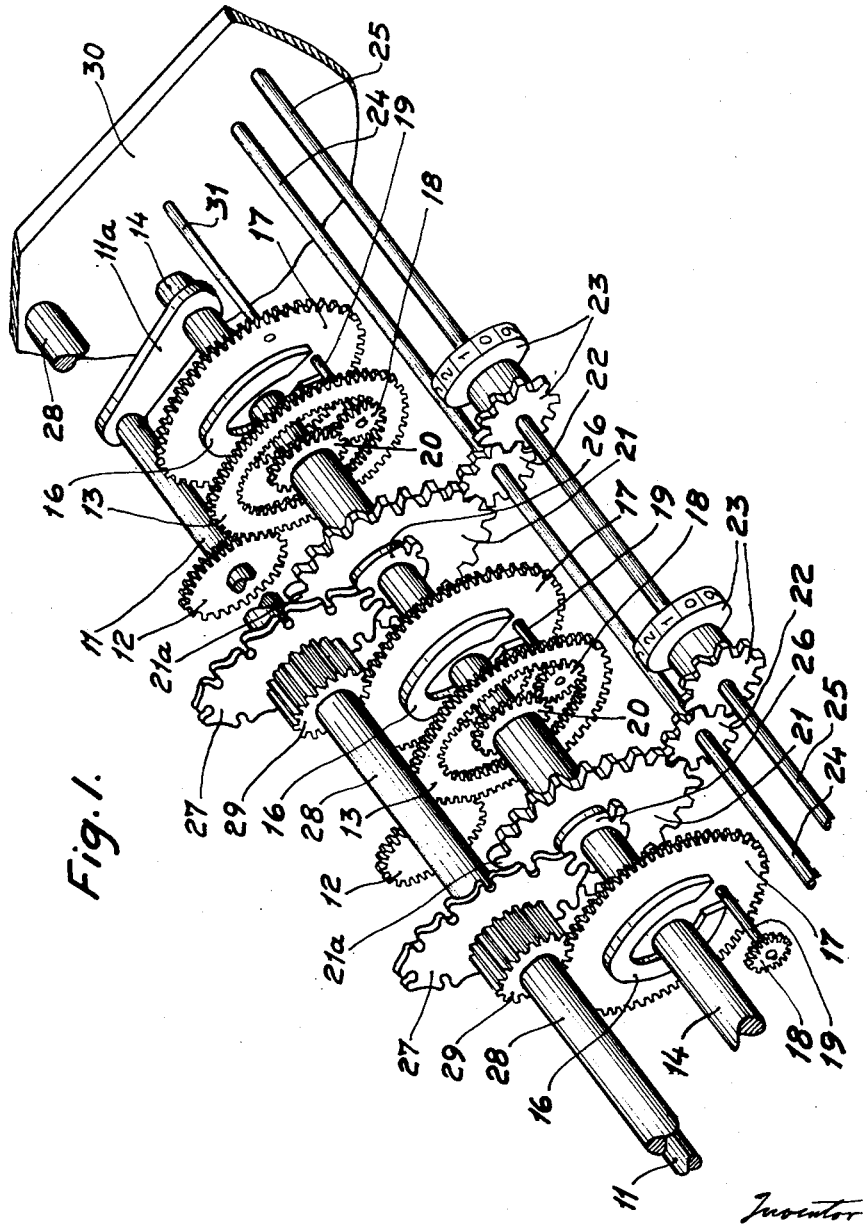

Nov. 14, 1950  S. TOORELL  2,529,747
ALIGNING MEANS FOR CRAWL-CARRY TRANSFER MECHANISMS
Filed May 29, 1948  3 Sheets-Sheet 1

Inventor
Steve Toorell
By David C. Marble
his Attorney

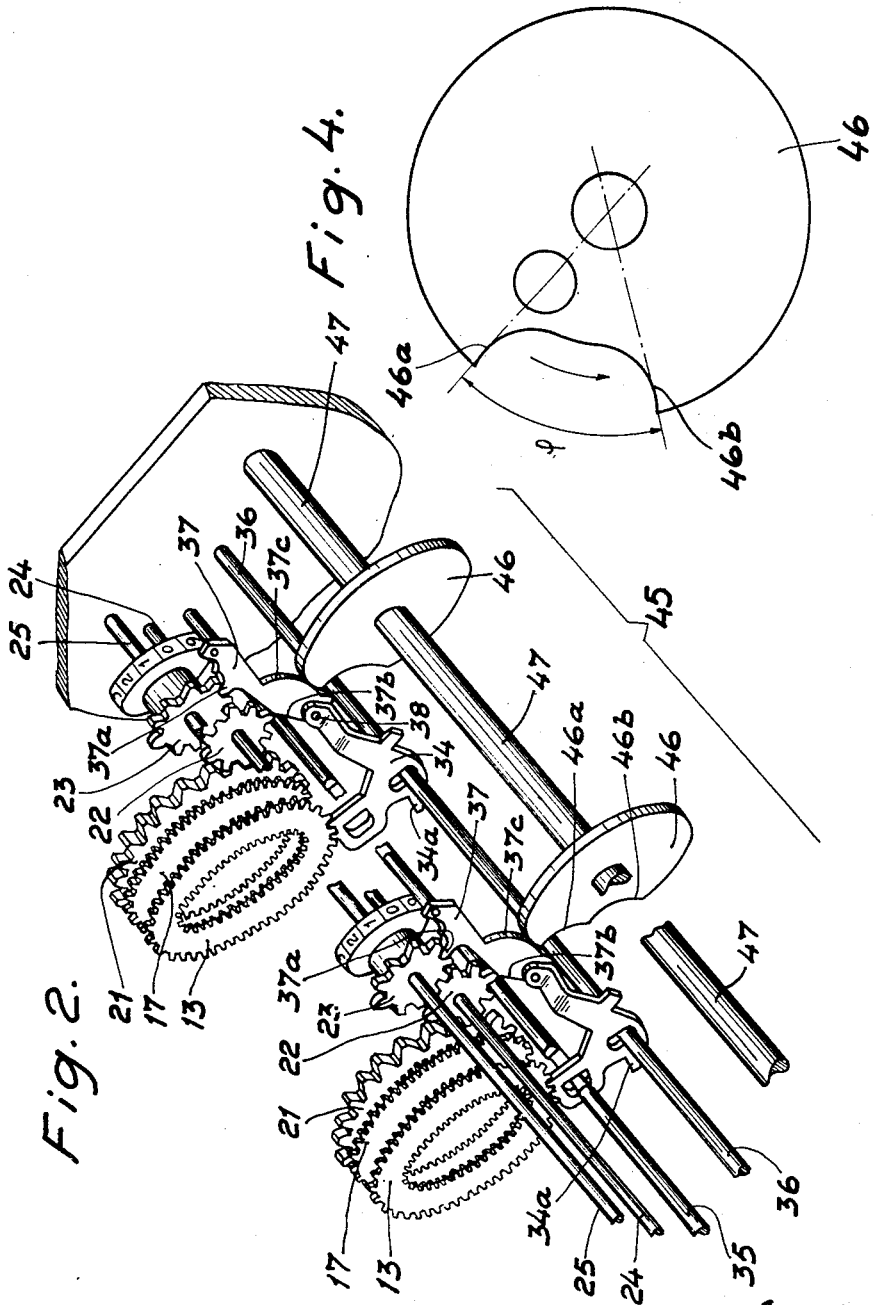

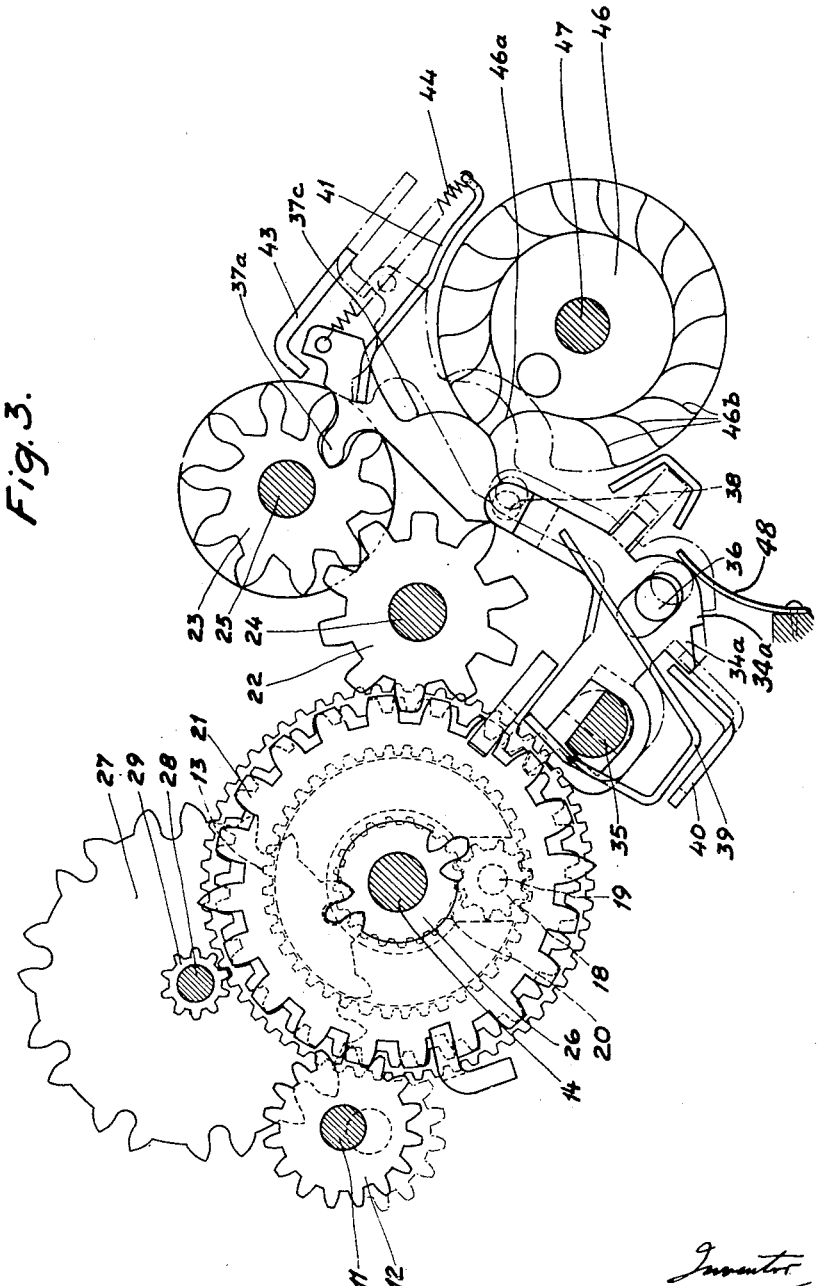

Patented Nov. 14, 1950

2,529,747

UNITED STATES PATENT OFFICE 2,529,747

ALIGNING MEANS FOR CRAWL-CARRY TRANSFER MECHANISMS

Sture Toorell, Atvidaberg, Sweden, assignor to Aktiebolaget Facit, Atvidaberg, Sweden, a joint-stock company of Sweden Application May 29, 1948, Serial No. 30,079
In Sweden June 6, 1947

4 Claims. (Cl. 235—136)

In calculating and similar machines of the type having registers in which a continuous tens transfer is effected during the whole revolution of the numeral wheel or a part thereof, it is impossible to read the final result immediately at the close of the calculating operations unless the register is aligned, that is to say, all the numeral wheels which due to the continuous tens transfer have been rotated through angles not corresponding to full steps (that is: to integers), must be turned backwards over a distance corresponding to the excess value (over the full step value), in order to show their proper numerals.

Devices for effecting such an alignment of the numeral wheels are already known and they mainly consist of impulse giving members, cooperating with the numeral wheel of each denomination. At the alignment operation said impulse giving members are determining the distance that the numeral wheel of the next higher denomination is to be turned backwards in order to show its correct numeral value, the impulses of said impulse-giving members being felt by devices effecting the alignment.

The devices heretofore known have, however, certain disadvantages: among other things they are quite bulky and complicated and work comparatively slowly.

A chief purpose of this invention is to reduce the axial distance between numeral wheels, thus making it possible to have a very short totalizer even in machines in which the register or totalizer has a large number of denominational orders. In addition, the reading of the register will be facilitated due to the fact that the numeral wheels will be closely adjacent one another.

An embodiment of the invention is illustrated by way of example in the annexed drawings. Fig. 1 shows a perspective view of a part of the register, the elements being drawn apart axially for the sake of clearness. Fig. 2 shows a similar view of the members for aligning the wheels of the register. Fig. 3 shows a side view of the aligning devices and the members cooperating with them and Fig. 4 shows a side view of a detail of the aligning device.

The register shown comprises the following main parts. A transmission wheel shaft 11 is by means of arms 11a swingably journalled around the main shaft 14 of the register, and carries series of transmission or intermediate wheels 12. These transmission wheels 12 are each in permanent mesh with the external teeth of their respective toothed (gear) rings 13, said rings being centrically arranged around the main shaft 14. The shaft 11, with the series of transmission wheels 12, is swingable around the main shaft of the register from a position, in which the transmission wheels are in mesh only with their respective toothed rings 13, to a position in which the transmission wheels are also in mesh with driving wheels (not shown) for the register. During the swinging motion the transmission wheels roll on the outside of their respective toothed rings.

The toothed rings 13, which have also internal teeth, are with the points of their internal teeth mounted on bearing members, consisting of rings 16 in the form of horseshoes which are centrically placed around the main shaft and each rigidly secured to a toothed wheel 17, said toothed wheels being journalled on the main shaft 14. To each of said toothed wheels a pin 19 is secured between the open arms of the horseshoe-shaped ring, said pin serving as a pivot for a planet wheel 18, which is in permanent mesh both with the internal teeth of the toothed ring 13 and also with the teeth of a sun wheel 20, journalled on the main shaft. Each one of these sun wheels is further rigidly connected with a toothed wheel 21, which itself is in mesh with a numeral wheel 23 via a transmission or intermediate wheel 22. All these transmission wheels 22 are journalled on a common shaft 24 and all the numeral wheels 23 on a special common shaft 25.

Each group of one sun wheel 20 and one toothed wheel 21 is furthermore rigidly connected with a driving Geneva wheel (a Geneva drive) 26. These Geneva drives are each engaging a driven Geneva wheel 27, all the wheels 27 being loosely journalled on a common shaft 28.

The hub of each driven Geneva wheel 27 is shaped to form a toothed wheel 29, which is in mesh with the above mentioned toothed wheel 17 of the next higher denomination, said toothed wheel carrying the planet wheel 18 and the toothed ring bearing 16. But the toothed wheel 17 of the lowest denomination is locked against rotation by means of a pin 31 secured in one end plate 30 of the machine frame.

Calculating operations in a register according to the invention are performed in the usual manner; in the embodiment shown the driving wheels not shown drive the transmission wheels 12; these driving wheels may have their rotary motion imparted in well-known manner, for instance from an actuator known per se. The driving wheels may also in well-known manner be driven at different speeds, depending on the value of the numeral set for each special case (for each denomination).

The motion of the driving wheels is transferred to the toothed ring 13 by means of the transmission wheels 12 and from there via the planet wheel 18 to the sun wheel 20 and thus to the wheels 21 and 22 and to the numeral wheel 23. Thus, when a numeral weel 23 is turned from its 0 position to the numeral value 2.5, the Geneva drive 26, cooperating with the wheel 23, causes its driven Geneva wheel 27 to rotate half a step; and when the numeral wheel 23 has been rotated to its position for the value 7.5 and therefrom to 0, the Geneva wheel 27 is in a like manner rotated an additional half step, between the positions 7.5 and 0.

The rotary motion of the Geneva wheel 27 is, via its hub shaped as a toothed wheel 29, transferred to the wheel 17 of the next higher denomination. The pin 19, connected with said wheel 17, and consequently also the planet wheel 18, are moved at the turning motion thus imparted to said wheel 17. This motion is transferred to the sun wheel 20 and thus via the wheels 21 and 22 to the numeral wheel 23 of the higher denomination.

The wheels 21, 22 and 23 are consequently driven both by the driving wheels belonging to the same denomination and also by the tens transfer motions caused by the rotation of the driving wheels of the lower denominations.

The gearings (ratios of transmission) are preferably selected in such a way that for each tooth (unit step), that the driving wheels are rotated, the wheels 21 and 22, together with the numeral wheel 23, are also turned one tooth (+one numeral step or unit), and that the three last mentioned wheels are turned one tooth for each step, that the Geneva wheel 27 of the nearest lower denomination is rotated.

In each denomination the device of alignment comprises a gear segment 34 radially displaceable on two shafts 35 and 36 so that the teeth of the segment may be brought into and out of mesh with the corresponding toothed ring 13 of the register. By means of a pin 38 an alignment hook 37 is articulately connected to said segment 34. The alignment hook 37 can be brought into and out of mesh with the teeth of that numeral wheel 23, which belongs to the next lower denomination in respect to the above-mentioned toothed ring 13 (see especially Fig. 2). The toothed segments 34 are axially guided in slots in a guide rail 39 and the alignment hooks are in a similar manner guided in corresponding slots in another guide rail 41. For the actuation of the alignment hooks 37 there is a rotor disk 46 arranged in front of each alignment hook 37. Said disks 46 are secured to a shaft 47, which is journalled in the end walls of the machine frame. The disks 46 and the shaft 47 together form the aligning rotor 45.

Each rotor disk 46 is provided with a recess (see Fig. 4), upwardly limited by the surface 46a and downwardly by the surface 46b. The surfaces 46a of all the disks are all arranged in the same position but the "centre angle" of the recess is successively increased (in the direction of the arrow in Fig. 4) towards higher denominations in such a manner, that the surfaces 46b in the alignment rotor 45 assume a helical form like a winding stairway (cfr. Fig. 3).

In Fig. 3 the alignment device is shown in that position in which the calculating operations may begin, i. e. the register in its aligned position.

When a calculating operation is to begin, the electric motor of the machine is started by depressing one of the operation keys of the machine. In well-known manner the depressing of said key causes the shaft of the alignment rotor 45 to be coupled to the motor shaft, which causes the alignment rotor 45 to be turned clock-wise about 15° (to the position shown in dot-and-dash lines in Fig. 3) so that the alignment hooks 37 may be pulled backwards (to the position shown in dot-and-dash lines in Fig. 3) by means of an L-shaped bar 43, which is guided in slots in the frame of the machine and moves in said slots under the actuation of a transmission device, coupled to the motor shaft in well-known manner. Then the front sides of the alignment hooks 37, which are formed to convex surfaces 37c, are introduced into the recesses of the corresponding rotor disks 46.

The shaft 35, which is provided with a sunk, plane recess, is now by means of a transmission device coupled to the motor shaft and turned counter-clockwise a quarter of a revolution, thus now releasing the toothed segments 34 for motion in the radial direction. This radial motion is effected by an L-shaped bar 40, guided in slots in a movable carriage and moved by a transmission, coupled to the motor shaft. The arrangement of said L-shaped bar 40 on the movable carriage is in the axial direction just in front of the driving wheels of the register, also situated on said movable carriage, as shown in the copending U. S. Patent Appln. No. 32,565 of Grip, and said bar is by the motor of the machine pulled downwards and forwards to its position shown in dot-and-dash lines in Fig. 3, thus engaging the teeth 34a on the toothed segments 34. Thus, these segments follow the bar 40 in its motion downwards and forwards. The driving wheels, described more in detail in U. S. Patent Appln. 32,565, which are a number less than the denominations of the register, are in well-known manner arranged on the movable carriage, which is provided with a setting device, which may be of a type well-known per se.

All of the toothed segments 34, situated just in front of the driving wheels on the movable carriage will thus be disengaged from the corresponding toothed rings 13 (see U. S. Patent Appln. 22,414). The other segments 34, which are not at the moment situated in front of corresponding driving wheels, will still be kept in mesh with their respective toothed rings by means of springs (48) or the like.

Simultaneously the transmission wheels 12, which are located on a common shaft, swingably arranged in the end plates of the machine (as shown in U. S. Patent Appln. 22,414), are swung into mesh with the driving wheels on the movable carriage, and in well-known manner the driving wheels are now ready to begin the calculating operations in the position of calculation concerned, the swinging motion of said common shaft of the transmission wheels is performed by means of a cam-disk-operated transmission, connected to the motor shaft.

At the close of said operations, step-shifting of the movable carriage to the next position of calculation is to be done, and this is effected in the following manner: The L-shaped bar 40 is now by its motor-driven transmission retracted to the position shown in full lines in Fig. 3, while simultaneously the shaft 35 in the same way is turned clockwise a quarter of a revolution, back to the position shown in full lines in Fig. 3, and the toothed segment 34 is thereby lifted so as to mesh with the toothed rings 13 and the segments and the toothed rings are now locked in this position by the shaft 35. The transmission wheels 12 are then swung in the same way as mentioned above out of mesh with the driving wheels and then the movable carriage is in well-known manner shifted one step to the next denomination and the driving wheels and the L-shaped bar 40, which are arranged on the movable carriage, follow the carriage in axial direction to the next denomination.

The set of transmission wheels 12 is now again swung into mesh with the driving wheels and the toothed segments 34 are drawn out of mesh with their respective toothed rings 13 in the manner described above, and the calculating operations in the next position of calculation may now begin.

After the operations in the final position of calculation have been completed and in consequence the transmission wheels 12 have been disengaged and the toothed segments 34 brought into mesh with corresponding toothed rings 13, the numeral wheels are to be aligned in order to make a final reading possible, which is done in the following manner.

First, the bar 43 is raised by means of the above mentioned transmission device to the position shown in full lines in Fig. 3, thereby releasing the alignment hooks 37. Then the alignment rotor 45 is rotated clockwise, and the surfaces 46b of the disks 46 act on the convex surface elements 37c of the alignment hooks 37 and raise the alignment hooks 37, beginning in the lowest denomination and continuing successively in the higher denominations in such a way, that the points 37a of the alignment hooks 37 will in turn be forced into the space between two teeth on the corresponding numeral wheel 23 while at the same time the back surfaces 37b of the alignment hooks 37 move into contact with the top of a tooth of the transmission wheel 22.

Each of the wheels 22 and 23 are provided with ten teeth, and the spaces between the teeth of the wheel 23 have different depths, which correspond to different heights of the teeth of the transmission wheel 22, and said depths of the tooth-spaces as well as the heights of the teeth are dimensioned in such a way that the point 37a of the alignment hook 37 will touch the bottom of a tooth-space and the back surface 37b of the alignment hook 37 contacts the top of a tooth while simultaneously the front convex surface 37c of the alignment hook 37 touches the rotor disk 46. This means, that the toothed segment 34 articulately connected to the alignment hook 37, will assume various angular positions while that toothed ring 13 which as mentioned above, belongs to the next higher denomination in relation to the numeral wheel 23, will now be turned by its corresponding toothed segment 34 in the minus direction over a distance, corresponding to above mentioned excess value due to the tens transfer.

Fig. 3 shows an alignment operation, when a numeral wheel shows the numeral value 0. In this case of course, the segment 34 will not be rotated. If on the contrary, the numeral wheel shows the numeral 9, the point 37a of the alignment hook 37 enters the shallowest tooth-space (the space of the least depth) and the surface 37b contacts the lowest top of the teeth on the transmission wheel 22. This means that the toothed segment 34 is swung through the greatest possible angle thereby rotating backwards both the toothed ring 13 in the next higher denomination and thus also the corresponding numeral wheel 23 eight tenths of a step, which corresponds to the tens transfer performed, as was mentioned above.

The helical arrangement of the surfaces 46b on the rotor disks 46 in the aligning rotor 45 is so selected, that when the aligning rotor is turned a full revolution by means of the motor shaft, the alignment of one numeral wheel is completed before the alignment of the next wheel begins.

In order to prevent the alignment hooks 37 from entering a non-aligned wheel owing to vibrations of the machine or other external disturbances, each alignment hook 37 is acted on by a spring 44.

The toothed segment 34 is guided by the shaft 35 in such a way that whenever the shaft 35 is in its position of alignment (shown in full lines in Fig. 3), the segment is positively kept in mesh with the toothed ring 13. The sunk plane recess of the shaft 35 in this case will allow the toothed segment 34 to swing counter-clockwise as much as corresponds to the largest excess value due to the tens transfer.

This sunk plane recess of the shaft 35 further allows the toothed segment 34 to be disengaged from the toothed ring 13 when said shaft is turned to the position shown in dot-and-dash lines in Fig. 3 (i. e. position of calculation), said segment being then locked against rotation by the shafts 35 and 36.

When the machine is returned from its position, aligned for reading, to its position for calculation the aligning rotor 45 is first rotated clockwise about 15° (Fig. 3), so that the L-shaped bar 43 can draw the alignment hooks 37 out of mesh. When then the shaft 35 is rotated to its position for calculation (the position shown in dot-and-dash lines in Fig. 3) the segments 34 and thereby the toothed rings 13 which are in mesh with said segments as well as the numeral wheels 23 which are connected to the toothed rings by means of a transmission (described more in detail in United States patent application Serial No. 22,414) are thus rotated back to their non-aligned position (position of calculation). The segments 34 are now disengaged from the toothed rings 13 by the L-shaped bar 40 and locked against rotation in the manner described above. The operations of calculation may now proceed in the same way as if an alignment for reading had not taken place.

I claim:

1. An aligning mechanism for a totalizer having a tens transfer device of the crawl-carry type comprising in combination a numeral wheel pinion fixed to each numeral wheel of the totalizer, a cooperating drive gear for each numeral wheel pinion, said numeral wheel pinions each having a plurality of tooth spaces of differing depths the tooth roots forming a spiral, each drive gear having teeth of varying radial height forming a spiral, said pinions and gear intermeshing with the longest tooth interfitting with the deepest tooth space, a plurality of aligning members each having separate surfaces adapted to simultaneously engage one with a tooth space of the corresponding numeral wheel pinion and the other with a tooth of the corresponding numeral wheel drive gear, a plurality of gear segments each articulately connected to one of said aligning members, said gear segments being adapted to mesh with one of the gears of the calculating gear train associated with the next higher denominational order of numeral wheel, and means for moving said aligning members sequentially into contact with a tooth and tooth space of the corresponding numeral wheel drive gear and numeral wheel pinion respectively to thereby cause oscillation of said connected gear segments through an amount dependent upon the particular pair of tooth spaces and teeth contacted.

2. An aligning mechanism for a totalizer having a tens transfer device of the crawl-carry type comprising in combination a numeral wheel pinion fixed to each numeral wheel of the totalizer, a cooperating drive gear for each numeral wheel pinion, said numeral wheel pinions each having a plurality of tooth spaces of differing depths the tooth roots forming a spiral, each drive gear having teeth of varying radial height forming a spiral, said pinions and gear intermeshing with the longest tooth interfitting with the deepest tooth space, a plurality of aligning members each having separate surfaces adapted to simultaneously engage one with a tooth space of the corresponding numeral wheel pinion and the other with a tooth of the corresponding numeral wheel drive gear, a plurality of gear segments each articulately connected to one of said aligning members, said gear segments being adapted to mesh with one of the gears of the calculating gear train associated with the next higher denominational order numeral wheel, a plurality of cams one cooperating with each of said aligning members, said cams being provided with cutouts arranged in helical form to move said aligning members sequentially into contact with a tooth and tooth space of the corresponding numeral wheel drive gear and numeral wheel pinion respectively to thereby cause oscillation of said connected gear segments through an amount dependent upon the particular pair of tooth spaces and teeth contacted.

3. An aligning mechanism for a totalizer having a tens transfer device of the crawl-carry type comprising in combination a numeral wheel pinion fixed to each numeral wheel of the totalizer, a cooperating drive gear for each numeral wheel pinion, said numeral wheel pinions each having a plurality of tooth spaces of differing depths the tooth roots forming a spiral, each drive gear having teeth of varying radial height forming a spiral, said pinions and gear intermeshing with the longest tooth interfitting with the deepest tooth space, a plurality of aligning members each having separate surfaces adapted to simultaneously engage one with a tooth space of the corresponding numeral wheel pinion and the other with a tooth of the corresponding numeral wheel drive gear, a plurality of gear segments each articulately connected to one of said aligning members, said gear segments being adapted to mesh with one of the gears of the calculating gear train associated with the next higher denominational order of numeral wheel, means for moving said aligning members sequentially into contact with a tooth and tooth space of the corresponding numeral wheel drive gear and numeral wheel pinion respectively to thereby cause oscillation of said connected gear segments through an amount dependent upon the particular pair of tooth spaces and teeth contacted, and means for simultaneously engaging all said gear segments with gears of the calculating gear train prior to the aligning operation.

4. An aligning mechanism for a totalizer having a tens transfer device of the crawl-carry type comprising in combination a numeral wheel pinion fixed to each numeral wheel of the totalizer, a cooperating drive gear for each numeral wheel pinion, said numeral wheel pinions each having a plurality of tooth spaces of differing depth the tooth roots forming a spiral, each drive gear having teeth of varying radial height forming a spiral, said pinions and gear intermeshing with the longest tooth interfitting with the deepest tooth space, a plurality of aligning members each having separate surfaces adapted to simultaneously engage one with a tooth space of the corresponding numeral wheel pinion and the other with a tooth of the corresponding numeral wheel drive gear, a plurality of gear segments each articulately connected to one of said aligning members, said gear segments being adapted to mesh with one of the gears of the calculating gear train associated with the next higher denominational order of numeral wheel, means for moving said aligning members sequentially into contact with a tooth and tooth space of the corresponding numeral wheel drive gear and numeral wheel pinion respectively to thereby cause oscillation of said connected gear segments through an amount dependent upon the particular pair of tooth spaces and teeth contacted, and means for normally holding said aligning members out of contact with said numeral wheel pinions and numeral wheel drive gears.

STURE TOORELL.

REFERENCES CITED

The following references are of record in the file of this patent:

UNITED STATES PATENTS

| Number | Name | Date |
|---|---|---|
| 1,246,087 | Gooch | Nov. 13, 1917 |
| 1,913,983 | Gardner | June 13, 1933 |
| 2,089,682 | Chase | Aug. 10, 1937 |
| 2,344,627 | Mixer | Mar. 21, 1944 |